US010705307B2

(12) United States Patent
Takeuchi et al.

(10) Patent No.: US 10,705,307 B2
(45) Date of Patent: Jul. 7, 2020

(54) OPTICAL CABLE WITH ILLUMINATION PATH (71) Applicant: Go!Foton Holdings, Inc., Somerset, NJ (US)

(72) Inventors: Kenichiro Takeuchi, North Brunswick, NJ (US); Haiguang Lu, Los Altos, CA (US)

( * ) Notice: Subject to any disclaimer, the term of this patent is extended or adjusted under 35 U.S.C. 154(b) by 0 days.

(21) Appl. No.: 15/932,219

(22) Filed: Feb. 16, 2018

(65) Prior Publication Data

US 2018/0246287 A1 Aug. 30, 2018

Related U.S. Application Data (60) Provisional application No. 62/459,915, filed on Feb. 16, 2017.

(51) Int. Cl.
*G02B 6/44* (2006.01)
*H02G 15/192* (2006.01)
*H02G 15/02* (2006.01)
*F21V 8/00* (2006.01)

(52) U.S. Cl.
CPC .......... *G02B 6/447* (2013.01); *G02B 6/4452* (2013.01); *H02G 15/02* (2013.01); *H02G 15/192* (2013.01); *G02B 6/0006* (2013.01); *G02B 6/0008* (2013.01); *G02B 6/44* (2013.01); *H02G 2200/20* (2013.01)

(58) Field of Classification Search
CPC ........ G02B 6/447; G02B 6/4452; G02B 6/44; G02B 6/0006; G02B 6/0008; H02G 15/192; H02G 15/02; H02G 2200/20
See application file for complete search history.

(56) References Cited

U.S. PATENT DOCUMENTS

| | | |
|---|---|---|
| 4,186,283 A | 1/1980 | Simmonds |
| 5,305,405 A | 4/1994 | Emmons et al. |
| 5,617,497 A | 4/1997 | Kingstone |
| 5,666,453 A | 9/1997 | Dannenmann |

(Continued)

OTHER PUBLICATIONS

International Search Report for PCT/US Application No. 1800036, dated Jun. 25, 2018.

*Primary Examiner* — Ryan A Lepisto
*Assistant Examiner* — Erin D Chiem
(74) *Attorney, Agent, or Firm* — Lerner, David, Litttenberg, Krumholz & Mentlik, LLP (57) ABSTRACT A cable device includes an elongated transmission member that defines a central axis, outer cover, and illumination element. The outer cover has an outer surface and a bore along its length. The illumination element extends in a direction parallel to the central axis and along a length of the transmission member. The illumination element has first and second exposed portions extending through separated openings of the outer surface of the outer cover. Each of first and second cross-sections of the respective first and second exposed portions define respective first and second illumination element central axes extending through the cross-sections in one or more directions transverse to the central axis of the transmission member. The illumination element is configured to convey a given light such that the given light that enters the first exposed portion of the illumination element exits the second exposed portion of the illumination element.

36 Claims, 7 Drawing Sheets (56) References Cited

U.S. PATENT DOCUMENTS

| | | | |
|---|---|---|---|
| 7,349,605 B2 | 3/2008 | Noonan et al. | |
| 7,489,843 B2 * | 2/2009 | Carlson | B29C 45/14549 |
| | | | 264/1.28 |
| 7,920,764 B2 | 4/2011 | Kewitsch | |
| 8,150,227 B2 | 4/2012 | Kewitsch | |
| 8,314,603 B2 * | 11/2012 | Russell | G02B 6/4416 |
| | | | 324/542 |
| 8,328,432 B2 | 12/2012 | Cooke et al. | |
| 8,428,405 B2 | 4/2013 | Kewitsch | |
| 8,620,123 B2 | 12/2013 | Dean, Jr. et al. | |
| 8,903,212 B2 | 12/2014 | Kachmar | |
| 9,304,278 B1 | 4/2016 | Bauco et al. | |
| 9,388,975 B2 | 7/2016 | Wenger | |
| 9,405,080 B2 * | 8/2016 | Lambourn | G02B 6/42 |
| 9,429,731 B2 | 8/2016 | Bookbinder et al. | |
| 9,435,969 B2 | 9/2016 | Lambourn et al. | |
| 9,671,551 B2 | 6/2017 | Dean, Jr. et al. | |
| 9,739,966 B2 | 8/2017 | Kachmar | |
| 2014/0363134 A1 | 12/2014 | Bookbinder et al. | |
| 2015/0043875 A1 | 2/2015 | Bookbinder et al. | |
| 2016/0025916 A1 | 1/2016 | Tyagi | |
| 2017/0123167 A1 * | 5/2017 | Isenhour | G02B 6/0008 |

* cited by examiner

OPTICAL CABLE WITH ILLUMINATION PATH

CROSS-REFERENCE TO RELATED APPLICATION

The present application claims the benefit of the filing date of U.S. Provisional Patent Application No. 62/459,915 filed Feb. 16, 2017, the disclosure of which is hereby incorporated herein by reference.

FIELD OF THE TECHNOLOGY

The present technology relates generally to optical and electrical connectors, and in particular relates to the determination of the connections of such devices.

BACKGROUND OF THE TECHNOLOGY

Optical fibers and electrical wires are optically or electrically connected to respective opposing optical fibers and electrical wires to convey signals between the respective connected fibers and wires which may occur in the operation of data storage and transmission devices. Such optical fibers and electrical wires, or other such cables, are often of considerable length and are often clustered together with a plurality of like fibers or wires.

Technicians or other professionals working with such fibers and wires often need to identify a connection between one end of such fiber and wires and an external device or panel that corresponds to a connection between an opposing end of respective such fibers and wires. Making this determination by testing various connections until the appropriate match is made or by following along a length of the fiber or wire is cumbersome.

Accordingly, there exists a need for improving the manner in which corresponding ends of optical fibers and electrical wires are identified.

BRIEF SUMMARY OF THE TECHNOLOGY

In accordance with an aspect of the technology, a cable device, which may be a cable assembly, may include an outer cover and an illumination element. The outer cover may have an outer surface and may define a linear or curvilinear central axis. The illumination element may be interior of the outer surface of the outer cover and may extend in a direction parallel to and along a length of the outer cover. The illumination element may have first and second exposed portions that may extend through separated openings of the outer surface of the outer cover. The first and the second exposed portions of the illumination element may have respective first and second cross-sections. Each of the first and the second cross-sections may define respective first and second illumination element central axes extending through the respective first and second cross-sections. The first and the second illumination element central axes may extend in one or more directions transverse to the central axis of the outer cover. In this manner, the illumination element may be configured to convey a given light such that the given light that enters the first exposed portion of the illumination element exits the second exposed portion of the illumination element.

In some arrangements, the cable device may include an optical fiber. The optical fiber may extend through a central bore of the outer cover. The optical fiber may be configured for connection with an optical fiber connector.

In some such arrangements, the illumination element and the optical fiber may be surrounded by the outer cover along each of their respective lengths.

In some arrangements, the illumination element may include first and second optical elements. The first and second optical elements may be configured to convey light and may be received through the respective separated openings in the one or more transverse directions to the central axis of the outer cover.

In some arrangements, the cable device may include cable connectors at opposing ends of the outer cover. The cable connectors may be configured for interfacing with panel connectors. The cable connectors may define first and second connector central axes. Either or both of the illumination element central axes may intersect and extend in one or more directions transverse to the respective first and second connector central axes of the cable connectors.

In some such arrangements, the separated openings of the outer cover through which the first and second exposed portions extend may be respective openings in the cable connectors.

In some arrangements, the separated openings may be adjacent opposing ends of the optical fiber such that the given light that enters the first exposed portion of the illumination element and exits the second exposed portion of the illumination element may provide an indication that the opposing ends of the optical fiber are associated with each other.

In some arrangements, the illumination element may include an optical fiber.

In some arrangements, the outer cover may have an inner surface separated from the outer surface of the outer cover to define a thickness and a central bore of the cable device. In some such arrangements, the illumination element may extend within at least a portion of the thickness of the outer cover. In other such arrangements in which the outer cover defines a thickness, a length of the illumination element may extend through the central bore.

In some arrangements, the optical fiber may be formed by a core surrounded by a first cladding. In some such arrangements, the cable device may further include a second cladding that may surround the first cladding along a length of the core. At least a portion of the illumination element may include a length of the first cladding.

In some such arrangements, the illumination element may further include first and second optical elements. The first and second optical elements may be configured to convey light and may be received through the respective separated openings in the one or more transverse directions to the central axis of the outer cover. In such arrangements, the first and second optical elements may be spaced from the first cladding of the optical fiber.

In some arrangements, the separated openings may be adjacent opposing ends of the optical fiber core such that the given light that enters the first exposed portion of the illumination element and exits the second exposed portion of the illumination element may provide an indication that the opposing ends of the optical fiber are associated with each other.

In some arrangements, the outer cover may define a central bore. The central bore may include a cladding and a plurality of cores spaced from each other. The cores may be embedded within the cladding and may extend through the central bore of the outer cover in a direction parallel to the central axis along a length of the outer cover. In some such arrangements, a first core of the cores may include at least a portion of the illumination element and may have faces exposed by the cladding. The faces may define first and second core central axes through the faces and may extend in at least one direction transverse to the central axis of the outer cover. In this manner, the first core may be configured to convey a given light such that the given light that enters one of the faces of the first core exits the other of the faces of the first core.

In some such arrangements, a second core of the cores may be configured for optical connection with an optical fiber connector.

In some arrangements, the faces of the first core may be adjacent opposing ends of the second core such that the given light that enters the one face of the first core and exits the other face of the first core may provide an indication that opposing ends of the second core are associated with each other.

In some arrangements, the cable device may include an electrically conductive wire. The wire may extend through the central bore of the outer cover. The electrically conductive wire may be configured for electrical connection with an electrical connector.

In some arrangements, the opposing end faces of the first core may be adjacent to opposing ends of the electrically conductive wire such that the given light that enters the one face of the first core and exits the other face of the first core may provide an indication that the opposing ends of the electrically conductive wire are associated with each other.

In some arrangements, the outer cover may further include portions of cable connectors at opposing ends of the outer cover for interfacing with panel connectors. The cable connectors may define first and second connector central axes. The first and second core central axes may extend in one or more directions transverse to the respective first and second connector central axes of the cable connectors.

In some arrangements, the first cross-section of the first exposed portion and the second cross-section of the second exposed portion of the illumination element may be bounded by respective separated openings of the outer surface.

In accordance with another aspect of the technology, a cable device, which may be a cable assembly, may include a transmission member, a first outer cover, and an illumination element. The transmission member may be elongated and may define a linear or curvilinear central axis. The first outer cover may have a first outer surface and a first bore along a length of the first outer cover. The illumination element may have a first section extending in a direction parallel to the central axis and along a length of the transmission member and a second section attached to the first section. The second section of the illumination element may have first and second exposed portions that may extend through separated openings of the first outer surface of the first outer cover. The first and the second exposed portions of the illumination element may have respective first and second cross-sections. Each of the first and the second cross-sections may define respective first and second illumination element central axes that may extend through each of these cross-sections in one or more directions transverse to the central axis of the transmission member. The illumination element may be configured to convey a given light such that the given light that enters the first exposed portion of the illumination element may exit the second exposed portion of the illumination element.

In some arrangements, the transmission member may be an optical fiber or an electrically conductive wire.

In some arrangements, the cable device may further include a second outer cover. The second outer cover may have a second outer surface and a second bore along a length of the second outer cover. The transmission member may extend through the second bore. In some arrangements, the first outer cover may have a first bore and the second outer cover may have a third bore. The first section of the illumination element may extend through the first bore of the first outer cover and a second section of the illumination element attached to the first section may extend through the third bore of the second outer cover.

In some arrangements, the first outer cover may extend from the second outer cover. In some arrangements, the first bore of the first outer cover may have a stepped configuration for receiving a corresponding stepped configuration of a tip of a light source.

In some arrangements, the cable device may include a cable connector that may be attached at an end of the second outer cover. The first outer cover may extend from the cable connector. In some arrangements, the first outer cover may include a clip. The clip may be attachable to the cable connector to maintain the position of the first outer cover relative to the cable connector.

In some arrangements, the cable device may further include an auxiliary connector and a cable connector. The auxiliary connector may be attached at an end of the first outer cover. The cable connector may be attached at an end of the second outer cover. The auxiliary connector may include a receptacle that may be configured for receiving a light source such that the light source emits light to the first exposed portion of the illumination element. The auxiliary connector may be attachable to the cable connector to maintain the position of the second outer cover relative to the cable connector.

In some arrangements, the receptacle may include a concave surface on an end of the receptacle. The first exposed portion of the illumination element may align with and may be exposed to the center of the concave surface.

In some arrangements, the receptacle may include an opening that may be configured for receiving a light source in a direction generally transverse to the central axis of the transmission member. The first exposed portion of the illumination element may be exposed to a portion of the receptacle. In some arrangements, the opening may have a first circumference and the receptacle may include a holding region that may have a second circumference larger than the first circumference such that the light source is retained by the receptacle when the light source is received in the holding region of the receptacle.

In some arrangements, the receptacle of the auxiliary connector may include a roughened surface. In some arrangements, the roughened surface of the receptacle may be coated with a florescent material.

In some arrangements, the first outer cover may completely surround a majority of the length of the illumination element.

In accordance with another aspect of the technology, a cable connection verification system may include a cable device, which may be a cable assembly, and a light source. The cable device may include a transmission member, a first outer cover, and an illumination element. The transmission member may be elongated and may define a linear or curvilinear central axis. The first outer cover may have a first outer surface and a first bore along a length of the first outer cover. The illumination element may have a first section extending in a direction parallel to the central axis and along a length of the transmission member and a second section attached to the first section. The second section of the illumination element may have first and second exposed portions that may extend through separated openings of the first outer surface of the first outer cover. The first and the second exposed portions of the illumination element may have respective first and second cross-sections. Each of the first and the second cross-sections may define respective first and second illumination element central axes that may extend through each of these cross-sections in one or more directions transverse to the central axis of the transmission member. The illumination element may be configured to convey a given light such that the given light that enters the first exposed portion of the illumination element may exit the second exposed portion of the illumination element. The light source may be configured to emit the given light to the first exposed portion of the illumination element.

In some arrangements, the illumination element may be a single mode optical fiber for conveying the given light at the wavelength of the given light.

In accordance with another aspect of the technology, a cable device, which may be a cable assembly, may include a transmission member and a cover. The transmission member may be elongated and may define a linear or curvilinear central axis. The cover may surround a length of the transmission member. The cover may include an open electrical circuit and a light source. The electrical circuit may be configured to be closed by an external voltage source. Upon closure of the electrical circuit, the light source may emit a light.

In some arrangements, the electrical circuit may include a pair of electrical contacts at or adjacent to a first end of the electrical circuit. The light source may be located at or adjacent to a second end of the electrical circuit opposite the first end. The pair of electrical contacts may be configured to be contacted simultaneously by the external voltage source to close the electrical circuit.

In some arrangements, the light source may be a light-emitting diode (LED).

In some arrangements, the outer cover may include a sheath and a flexible strip. The sheath may surround the length of the transmission member. The flexible strip may be attached to and may be detachable from the sheath. At least a portion of the electrical circuit may be attached to the strip.

In some arrangements, the electrical circuit may include an electrically conductive wire. At least a portion of the wire may extend along and may be within the thickness of the flexible strip. A portion of the flexible strip may expose separated sections of the wire. The separated sections of the wire may be configured to be closed by the external voltage source.

In some arrangements, the flexible strip may be bonded to the sheath by an adhesive.

In accordance with another aspect of the technology, a cable connection verification system may include a cable device and an external voltage source. The cable device, which may be a cable assembly, may include a transmission member and a cover. The transmission member may be elongated and may define a linear or curvilinear central axis. The cover may surround a length of the transmission member. The cover may include an open electrical circuit and a light source. The electrical circuit may be configured to be closed by the external voltage source. Upon closure of the electrical circuit, the light source may emit a light.

In some arrangements, the external voltage source may be a battery-powered electrical probe.

In accordance with another aspect of the technology, an electrically conductive flexible strip may include an elongated body, an open electrical circuit, and a light source. The elongated body may have a contour that may be configured to surround at least a portion of a circumference of a cable. The open electrical circuit may extend along a majority of a length of the body. The electrical circuit may be configured to be closed by an external voltage source. Upon closure of the electrical circuit, the light source may emit a light.

In accordance with another aspect of the technology, a cable connection of a cable among a plurality of cables may be verified by a process. In this process, a light may be emitted at or adjacent to a first end of a cable connected to a first external device. The light may be received at or adjacent to a second end of the cable opposite the first end to indicate that the first and the second ends of the cable correspond to the same cable. The second end being connected to a second external device.

In accordance with another aspect of the technology, a cable connection of a cable among a plurality of cables may be verified by a process. In this process, terminals of an external voltage source may be connected to contacts attached to a cable at or adjacent to a first end of the cable connected to a first external device. A light may be emitted from a light source attached to the cable at or adjacent to a second end of the cable opposite the first end of the cable. The second end being connected to a second external device.

These and other features of the present disclosure will be more fully described with reference to the accompanying figures.

BRIEF DESCRIPTION OF THE DRAWINGS

By way of example only, embodiments of the present disclosure will be described herein with reference to the accompanying drawings, in which.

DETAILED DESCRIPTION

Figure 1:
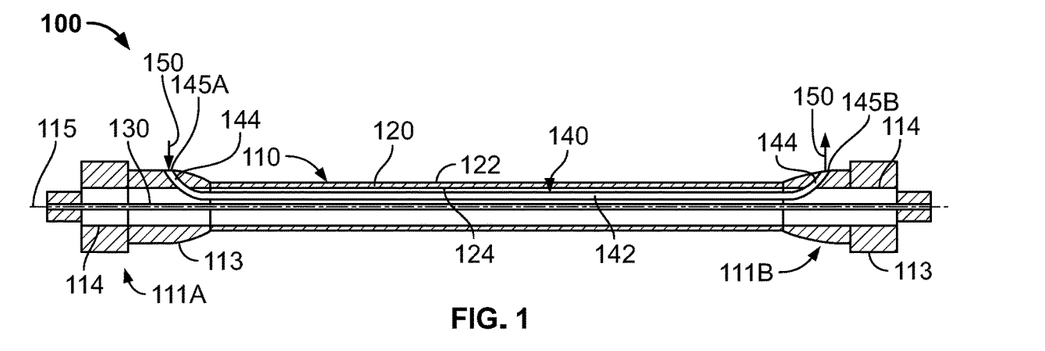
FIG. 1 is a side cross-sectional view of an optical cable in accordance with an embodiment.

Referring now to the drawings, as shown in FIG. 1, cable 100 may be an optical fiber cable including sheath or jacket 110, optical fiber 130, which is formed from a core and a cladding (not shown), and illumination element 140. Each of fiber 130 and illumination element 140 may be disposed within elongated central bore 120 defined by jacket 110. Cable 100 may include opposing cable connectors 111A, 111B at opposing ends of the cable, and elongated central bore 120 may extend between the cable connectors along curvilinear central axis 115 defined by jacket 110. In some arrangements, the central axis may be linear. As in the example shown, cable connectors 111A, 111B may be ST optical fiber connectors, although other connector types may be utilized as described further herein. Jacket 110 may be but is not limited to being made of poly vinyl chloride (PVC) such that the jacket may be elastically flexible. Jacket 110 may have outer surface 122 and inner surface 124 spaced from the outer surface to define a thickness of the jacket. Inner surface 124 may define central bore 120.

As further shown, optical fiber 130, which may include one or a plurality of cores and may be used for conveying communication signals in cable 100, may extend through central bore 120 defined by inner surface 124 of jacket 110 along a path parallel to central axis 115 which, as in this example, may be substantially along the central axis. Optical fiber 130 preferably may be a data signal transmission optical fiber which may be configured for optical connection with an optical element. Such an optical element may be but is not limited to being placed in a port of a patch panel assembly, such as the port disclosed in U.S. Pat. No. 8,939,792, the disclosure of which is hereby incorporated by reference herein.

Each of cable connectors 111A, 111B may include sheath 113, which may act as a boot, defining central sheath bore 114 through which optical fiber 130 may further extend along central axis 115 defined by jacket 110, which as shown may be a substantially linear axis along the lengths of each of the cable connectors.

As in this example, illumination element 140 may be a single optical fiber which, as in this example, may have a larger diameter than optical fiber 130. Illumination element 140 may be at least translucent, and preferably may be transparent, to the human eye. Illumination element 140 may be, but is not limited to being, a multimode optical fiber (MMF). Illumination element 140 may be, but is not limited to being made of one or more plastic materials, such as but not limited to acrylic, i.e., polymethyl methacrylate (PMMA), and fluoropolymers. First portion 142 of illumination element 140 may be received within and extend through central bore 120 along a path parallel to central axis 115 and adjacent to optical fiber 130. Second portions 144 of illumination element 140 extending from opposing ends of first portion 142 of the illumination element may be received within and extend through respective central sheath bores 114 of sheaths 113 from which second portions 144 may curve in a direction transverse to central axis 115 defined by jacket 110 and through respective thicknesses of the sheaths of cable connectors 111A, 111B. As shown, regions of second portions 144 of illumination element 140 exposed by central sheath bores 114 of sheaths 113 may be flush with outer surfaces of the sheaths. In alternative arrangements, second portions 144 may extend beyond the respective outer surfaces of the sheaths (see FIGS. 3A and 3B, for example).

Ends of an optical fiber for use as illumination element 140 may be softened by heating and then may be bent at an angle and polished to have a surface for light diffusion in forming second portions 144. In an alternative arrangement, second portions 144 may be formed separately from first portion 142 and then may be attached by an adhesive, such as but not limited to epoxy, or melted together. In either of these arrangements, first portions 142 may be, but are not limited to being, integral with the second portions such that the first and second portions are inseparable without fracture of either of these portions.

Opposing termination faces 145A, 145B of illumination element 140 may be exposed through respective sheaths 113, such that central axes defined by the opposing faces extend in respective directions transverse to central axis 115 defined by jacket 110 and in particular respective directions transverse to the substantially linear portion of the central axis along the lengths of respective cable connectors 111A, 111B. In this configuration, light 150 that is introduced through termination face 145A of illumination element 140 may be conveyed through the first portion 142 of the illumination element and exit termination face 145B of the illumination element. In such a manner, a correspondence of cable connectors 111A, 111B of cable 100 may be detected to differentiate the cable connectors from such connectors of other cables which may be nearby in a connector system without having to disconnect either of the cable connectors from a corresponding terminal or port.

Figure 2A:
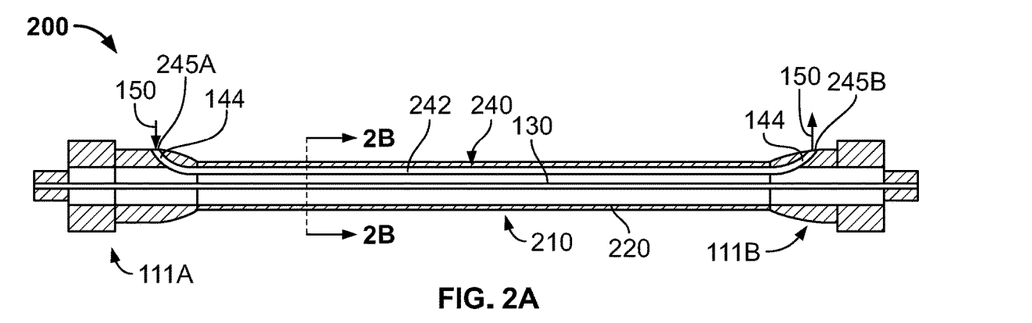
FIG. 2A is a side cross-sectional view of an optical cable in accordance with another embodiment.
Figure 2B:
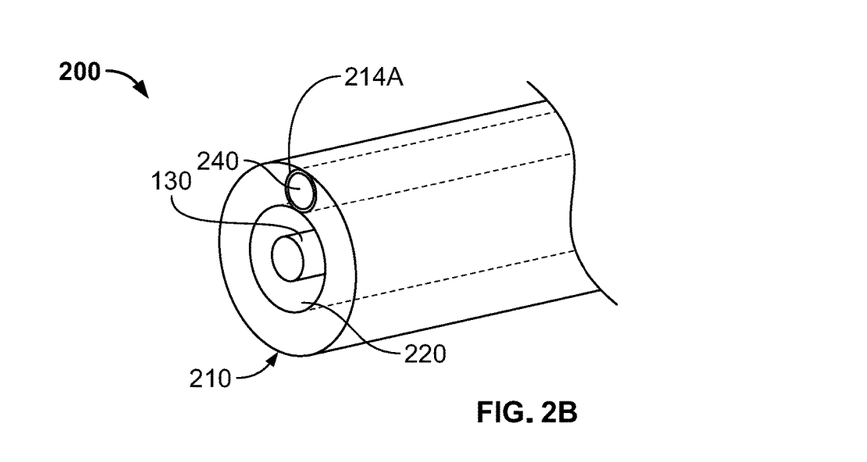
FIG. 2B is a partial perspective view of the optical cable of FIG. 2A at the position of line 2B-2B.

Referring now to FIGS. 2A and 2B, cable 200 operates in the same or substantially the same manner as cable 100. Cable 200 may include jacket 210, optical fiber 130 within central bore 220 defined by jacket 210, and illumination element 240 embedded at least partially within the jacket. Jacket 210 may be the same as jacket 110 with the exception that jacket 210 may include bore 214A that extends along and within a portion of the thickness of jacket 210. In forming cable 200, jacket 210, which may be but is not limited to being made of PVC, may be molded over illumination element 240. Illumination element 240, which may be the same or substantially the same as illumination element 140 of cable 100, may extend through bore 214A of jacket 210 and then, as in the arrangement of cable 100, into each of cable connectors 111A, 111B. In this configuration, light 150 that is introduced through termination face 245A of illumination element 240 may be conveyed along a length of longitudinally extending portion 242 of illumination element 240 and exit termination face 245B of the illumination element. In such a manner, a correspondence of cable connectors 111A, 111B of cable 200 may be detected to differentiate the cable connectors from such connectors of other cables which may be nearby in a connector system without having to disconnect either of the cable connectors from a corresponding terminal or port.

Figure 3A:
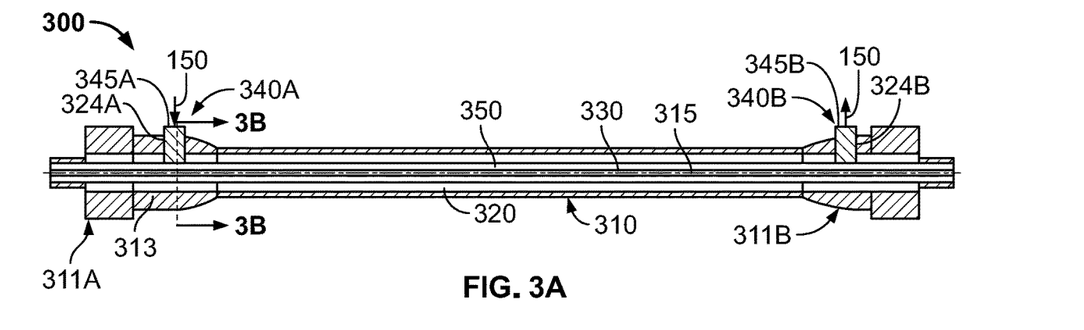
FIG. 3A is a side cross-sectional view of an optical cable in accordance with another embodiment.
Figure 3B:
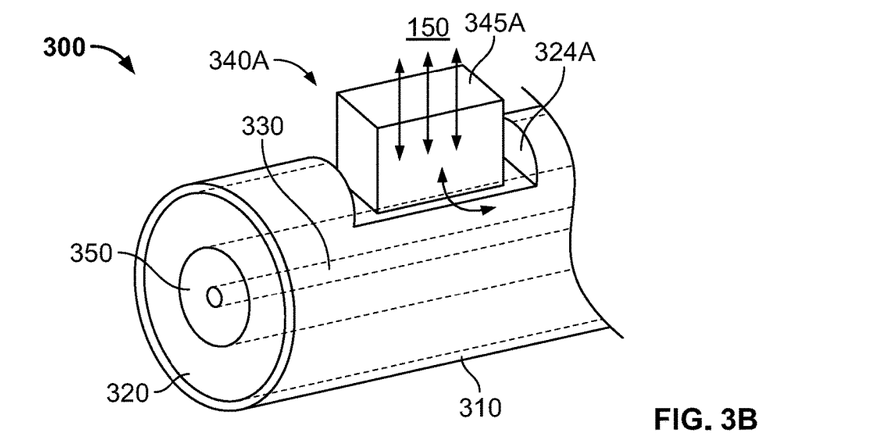
FIG. 3B is a partial cross-sectional view the optical cable of FIG. 3A at the position of line 3B-3B in which the cable connector is removed.

With reference to FIGS. 3A and 3B, optical fiber cable 300 may be a double clad optical fiber cable which may operate in the same or substantially the same manner as cable 100. Cable 300 may include sheath or jacket 310 surrounding outer cladding 320, which surrounds inner cladding 350, which surrounds core 330, and may further include illumination elements 340A, 340B that extend from a portion of the inner cladding. Jacket 310 may include opposing cable connectors 311A, 311B and a length of cable 300 may extend between the cable connectors along curvilinear central axis 315 defined by the jacket. Opposing cable connectors 311A, 311B in combination with outer cladding 320 and inner cladding 350 may define respective separated openings 324A, 324B extending through the outer cladding, and through jacket 310 in some arrangements in which jacket 310 extends into the cable connectors as in the example shown, to expose the inner cladding. Separated openings 324A, 324B may be prepared by removing, e.g., by chemical etching or mechanical grinding, portions of connector sheaths 313 covering a portion of jacket 310 and outer cladding 320 where it is otherwise surrounded by the sheaths, after stripping or otherwise removing a portion of jacket 310 as necessary, from an off-the-shelf double clad optical fiber cable.

Illumination elements 340A, 340B may be at least translucent, and preferably may be transparent, to the human eye. Illumination elements 340A, 340B may be attached, such as by but not limited to being by an adhesive which may be but is not limited to being epoxy, to inner cladding 350 such that illumination elements 340A, 340B may extend beyond respective outer surfaces of cable connectors 311A, 311B surrounding outer cladding 320, as shown. In some alternative arrangements, illumination elements similar to illumination elements 340A, 340B may be flush with the respective outer surfaces cable connectors 311A, 311B (see FIGS. 1, 2A, 2B, for example). Inner cladding 350 also may be at least translucent, and preferably may be transparent, to the human eye such that the inner cladding 350 may be operably coupled to illumination elements 340A, 340B to provide for transmission of light between the illumination elements.

Accordingly, in the configuration shown, light 150 that is introduced through termination face 345A of illumination element 340A may pass through illumination element 340A, then may be coupled into inner cladding 350 at a location adjacent to illumination element 340A, may be conveyed along a longitudinally extending length of inner cladding 350, then may exit the inner cladding at a location adjacent to illumination element 340B, and then may exit termination face 345B of illumination element 340B. In such a manner, a correspondence of cable connectors 311A, 311B of cable 300 may be detected to differentiate the cable connectors from such connectors of other cables which may be nearby in a connector system without having to disconnect either of the cable connectors from a corresponding terminal or port.

Figure 4:
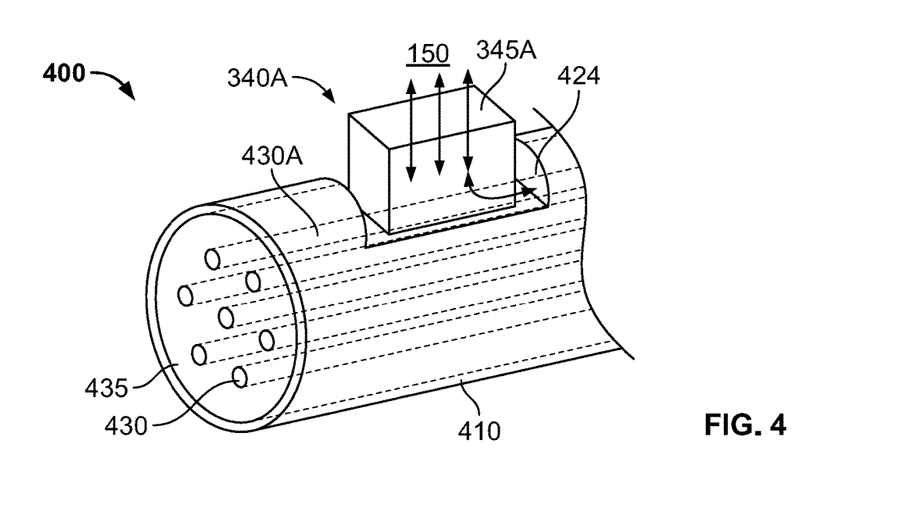
FIG. 4 is a partial perspective view of an optical cable in accordance with another embodiment.

Referring now to FIG. 4, cable 400 may be a multicore optical fiber cable which may operate in the same or substantially the same manner as cable 300. Cable 400 may include jacket 410, a plurality of cores 430 embedded within cladding 435, and opposing illumination elements 340A, 340B (340B not shown in FIG. 4) that extend from first core 430A. Jacket 410 may contain cladding 435 through which the plurality of cores 430 extend in a direction parallel to a curvilinear central axis of the jacket (similar to the curvilinear central axis of jacket 110 described previously herein).

As shown, core 430A may be the same as cores 430 with the exception that core 430A, which serves as an illumination path, may be exposed by separated openings 424 of cladding 435 defined by respective opposing cable connectors, such as but not limited to cable connectors 311A, 311B, and in some arrangements in which jacket 410 extends into the cable connectors, in combination with jacket 410. Separated openings 424 may be prepared by removing, such as by chemical etching or mechanical grinding, portions of connector sheaths 313 (see FIG. 3A) and cladding 435 where it is otherwise surrounded by the sheaths, after stripping or otherwise removing a portion of jacket 410 as necessary, from an off-the-shelf multicore optical fiber cable.

Core 430A, like any of the illumination elements described previously herein, may be at least translucent, and preferably may be transparent, to the human eye. Illumination elements 340A, 340B may be attached, such as by but not limited to being by an adhesive which may be but is not limited to being epoxy, to core 430A. In this manner and similar to the arrangement of illumination elements 340A, 340B in cable 300, the illumination elements of cable 400 may extend beyond (See FIG. 3A, for example) or may be flush with (See FIGS. 1, 2A, 2B, for example) respective outer surfaces of cable connectors, such as cable connectors 311A, 311B, that may surround opposing ends of jacket 410.

Accordingly, in the configuration shown, light 150 that is introduced through termination face 345A of illumination element 340A may pass through illumination element 340A, then may be coupled into core 430A at a location adjacent to illumination element 340A, then may be conveyed along a longitudinal length of core 430A and exit core 430 at a location adjacent to illumination element 340B (See FIG. 3A, for example), and then may exit termination face 345B of illumination element 340B (again see FIG. 3A, for example). In such a manner, a correspondence of cable connectors, such as cable connectors 311A, 311B, of cable 400 may be detected to differentiate the cable connectors from such connectors of other cables which may be nearby in a connector system without having to disconnect either of the cable connectors from a corresponding terminal or port.

Figure 5:
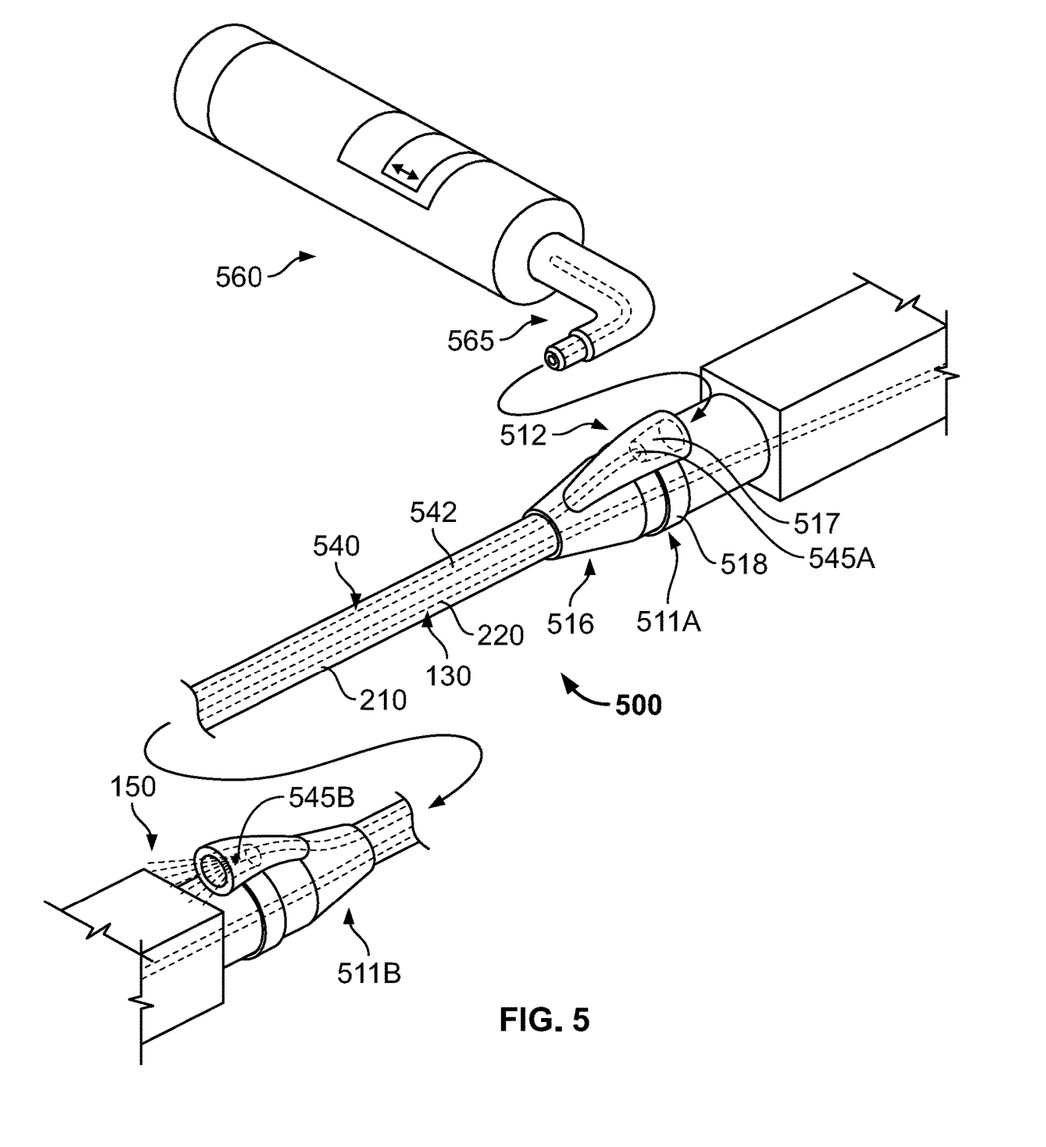
FIGS. 5-8 are partial perspective views of cable connection verification systems in accordance with other embodiments.

Referring now to FIG. 5, cable 500 operates in the same or substantially the same manner as cable 200. Cable 500 may include jacket 210, optical fiber 130 within central bore 220 defined by jacket 210, and illumination element 540. As shown, illumination element 540 may be embedded at least partially within jacket 210, although in alternative arrangements the illumination element may extend through a central bore as in the example of FIG. 1. Illumination element 540, which may be the same or substantially the same as illumination element 240 of cable 200, and thus may extend through bore 214A of the jacket, with the exception that illumination element 540 may extend into each of cable connectors 511A, 511B in place of cable connectors 111A, 111B and may have opposing termination ends 545A, 545B in place of termination faces 245A, 245B. Cable connectors 511A, 511B may be substantially the same as cable connectors 111A, 111B with the notable exception that each of cable connectors 511A, 511B includes extension connector cover 512 that intersects with and extends from main connector cover 516 that surrounds a portion of jacket 210 and is configured in substantially the same form as each of cable connectors 111A, 111B. In this manner, illumination element 540 extends from jacket 210 into a portion of main connector cover 516 and then through all, or as shown, a portion of central bore 517 defined by extension connector cover 512. To maintain a relative position between extension connector cover 512 and main connector cover 516, and thus between illumination element 540 and main connector cover 516, clip 518 extends from the extension connector cover and around a portion of the main connector cover. In alternative arrangements, a clip may extend from the main connector cover and around a portion the extension connector cover, and in other alternative arrangements, the extension connector cover and the main connector cover may be adhered together or integral with each other, i.e., form a monolithic structure such that these covers are inseparable without fracture of either cover, in order to maintain a relative position between the covers.

As shown, termination ends 545A, 545B may be within central bore 517 and may face an opening of and be exposed by extension connector cover 512. In this configuration, light 150 that is introduced through termination face 545A of illumination element 540 may be conveyed along a length of longitudinally extending portion 542 of illumination element 540 and exit termination face 545B of the illumination element. In such a manner, a correspondence of cable connectors 511A, 511B of cable 500 may be detected to differentiate the cable connectors from such connectors of other cables which may be nearby in a connector system without having to disconnect either of the cable connectors from a corresponding terminal or port.

As in the example shown in FIG. 5, light 150 may be introduced through termination face 545A (or likewise termination face 545B) by inserting tip 565 of light source 560 into central bore 517 of extension connector cover 512. In this example, light source 560 is battery operated, although in alternative arrangements, other known power sources including utility power may be utilized to generate light 150. Tip 565 may be bent at a sharp angle, in the example shown an angle of approximately 90 degrees although any angle less than 180 degrees including 0 degrees is possible. The sharper angles allow tip 565 to be inserted within central bore 517 of extension connector cover 512 when cable connector 511A is connected to a corresponding terminal or port that may otherwise interfere with the insertion of the extension connector cover.

Figure 6:
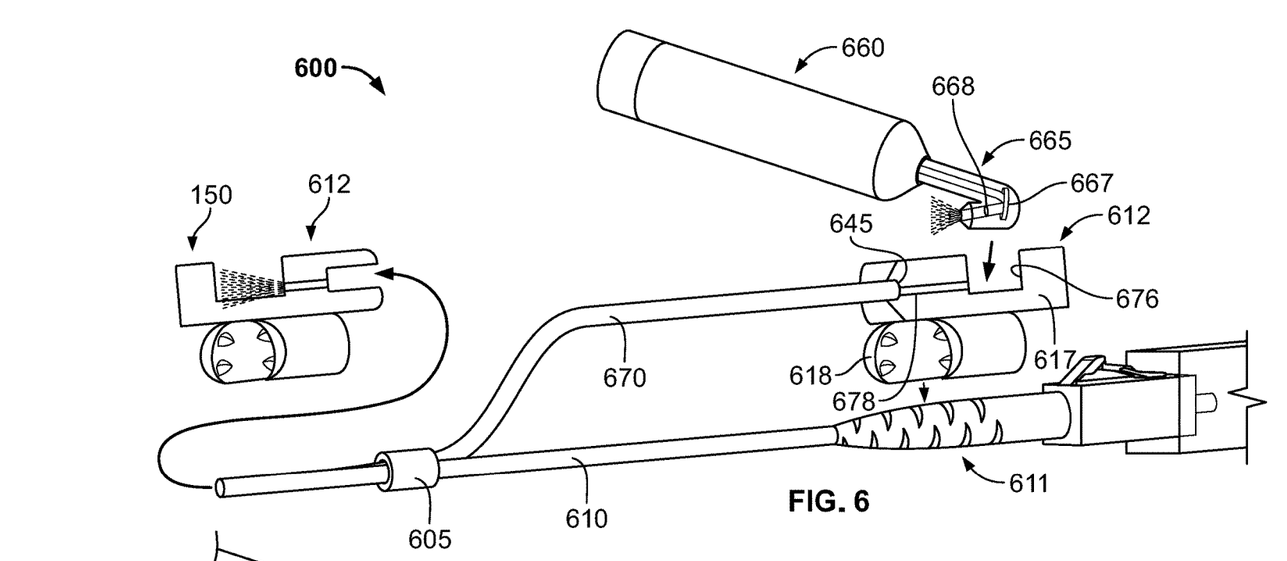

Referring now to FIG. 6, cable assembly 600 operates in the same or substantially the same manner as cable 500. Cable assembly 600 may include jacket 610, optical fiber 130 within jacket 610, an illumination element (not shown) extending within additional jacket 670 surrounding the illumination element, and one or, more preferably, a plurality of cable clips 605 attaching jacket 610 to additional jacket 670. Optical fiber 130 and, in some arrangements, jacket 610 may extend into opposing cable connectors 611. The illumination element of cable assembly 600, which may be the same or substantially the same as illumination element 540 of cable 500 with the exception that the illumination element of cable assembly 600 may extend into each of opposing auxiliary connectors 612 in place of cable connectors 511A, 511B and may have opposing termination ends 645 in place of termination ends 545A, 545B.

Opposing auxiliary connectors 612 may include main body 617 and connector clip 618 extending from the main body. Main body 617 of each of opposing auxiliary connectors 612 may define receptacle 676 and passage 678 extending from the receptacle. As further shown in FIG. 6, when the illumination element of cable assembly 600 is inserted into each opposing auxiliary connector 612, termination end 645 of the illumination element defines an end of passage 678 of the auxiliary connector opposite an end of the passage defined by receptacle 676, i.e., the passage extends between the illumination element and the receptacle when the illumination element is received in the opposing auxiliary connector. To maintain a relative position between opposing auxiliary connectors 612 and corresponding cable connectors 611, and thus between the illumination element and corresponding cable connectors 611, connector clip 618 extends from each auxiliary connector and around a portion of the corresponding cable connector. In alternative arrangements, a clip may extend from each cable connector and around a portion of the respective auxiliary connector, and in other alternative arrangements, each auxiliary connector and the respective cable connector may be adhered together or integral with each other, i.e., form a monolithic structure such that these connectors are inseparable without fracture of either connector, in order to maintain a relative position between the connectors.

As shown, termination ends 645 of the illumination element of cable assembly 600 are exposed by a combination of receptacle 676 and passage 678. In this configuration, light 150 introduced into receptacle 676 may be further introduced through one termination end 645 of the illumination element and may be conveyed along a length of the illumination element and exit opposing termination end 645 of the illumination element. In such a manner, a correspondence of opposing cable connectors 611 of cable 600 may be detected to differentiate the cable connectors from such connectors of other cables which may be nearby in a connector system without having to disconnect either of the cable connectors from a corresponding terminal or port.

As in the example shown in FIG. 6, light 150 may be introduced into receptacle 676 and through termination end 645 on an end of the illumination element by inserting tip 665 of light source 660 into the receptacle. In this example, light source 660 is battery operated, although in alternative arrangements, other known power sources including utility power may be utilized to generate light 150. Tip 665 may be blunt and have an outer surface corresponding to the shape of receptacle 676. Tip 665 may include mirror 667 for redirecting light 150 and focusing lens 668 for focusing the light into passage 678 and then through termination faces 645 of the illumination element.

Figure 7:
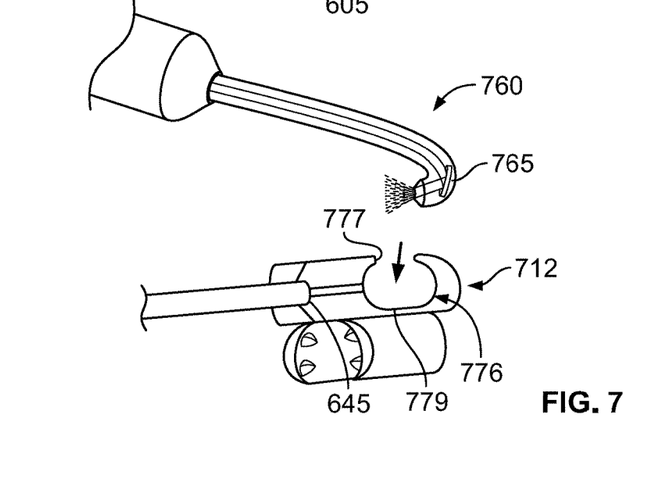

As shown in FIG. 7, auxiliary connector 712 may be used in place of auxiliary connector 612. Auxiliary connector 712 is the same or substantially the same as auxiliary connector 612 with the exception that auxiliary connector 712 includes receptacle 776 in place of receptacle 676. Receptacle 776 defines opening 777 having a first circumference and holding region 779 having a second circumference larger than the first circumference. In this manner, light source 760 having a diameter greater than the largest diameter of opening 777 is retained by receptacle 776 when the light source is received in holding region 779 of the receptacle.

As in the example shown in FIG. 7, light 150 may be introduced into receptacle 776 and through termination face 645 on an end of the illumination element by inserting tip 765 of light source 760 into receptacle 776. Light source 760 may be the same as or substantially the same as light source 660 with the exception that light source 760 may include more rounded surfaces and a chamfer to correspond with a shape of receptacle 776.

Figure 8:
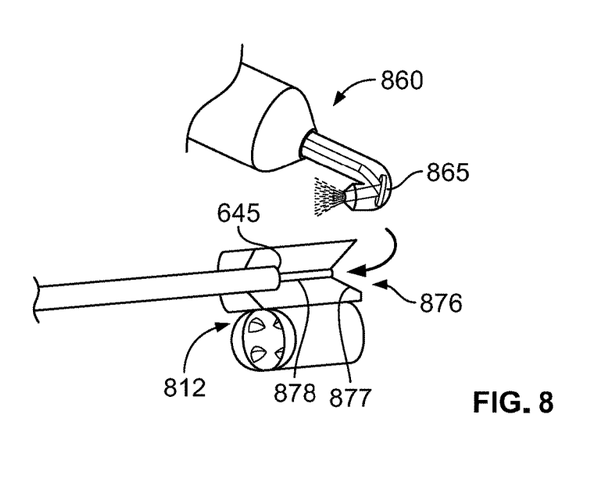

As shown in FIG. 8, auxiliary connector 812 also may be used in place of auxiliary connector 612. Auxiliary connector 812 is the same or substantially the same as auxiliary connector 612 with the exception that auxiliary connector 812 includes receptacle 876 in place of receptacle 676. Receptacle 876 may define concave surface 877, which may be chamfered as shown, and further define an end of auxiliary connector 812. As shown, termination end 645 of the illumination element exposed by passage 878 extending from receptacle 876 may align with the center of concave surface 877.

As in the example shown in FIG. 8, light 150 may be introduced into receptacle 876 and through termination end 645 of the illumination element by inserting tip 865 of light source 860 into receptacle 876. Light source 860 may be the same as or substantially the same as light source 760 with the exception that light source 860 may include a corn shape. An outer surface of the end of tip 865 of light source 860 may be chamfered to have the reciprocal configuration to concave surface 877 of receptacle 876 of auxiliary connector 812 such that the surfaces mate to aid in aligning a center of the tip of the light source with a center of termination end 645 of the illumination element.

Figure 9A:
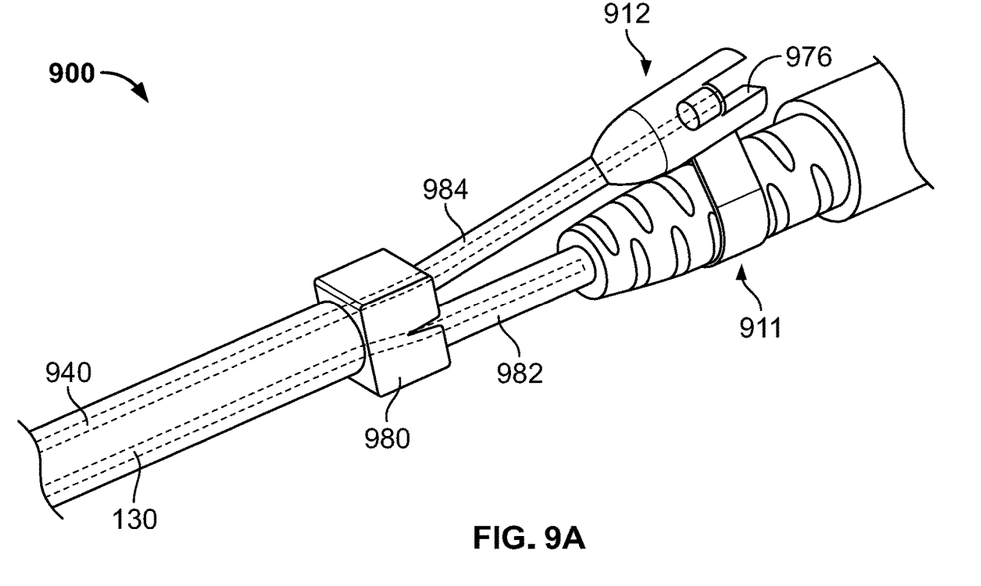
FIG. 9A is a partial perspective view of a cable and connector receptacle in accordance with another embodiment.

Referring now to FIG. 9A, cable 900 operates in the same or substantially the same manner as cable 100. Cable 900 may include main jacket 910, splitter 980 attached at one or both ends of the main jacket, extension jacket 982 attached to and extending from the splitter, auxiliary jacket 984 attached to and extending from the splitter, optical fiber 130 extending within the main jacket and the extension jacket, and illumination element 940 extending within the main jacket and the auxiliary jacket. As shown, illumination element 940 may extend through a central bore of main jacket 910 and auxiliary jacket 984, although in alternative arrangements the illumination element may be embedded at least partially within either or both of the main jacket and the auxiliary jacket as with the jacket in the example of FIG. 2.

Optical fiber 130, and in some arrangements extension jacket 982, may be inserted through opposing cable connectors 911 which may be substantially the same as cable connectors 111A, 111B with the exception of their size. Illumination element 940, which may be a tracing optical fiber, and in some arrangements auxiliary jacket 984, may be inserted through auxiliary connector 912. Auxiliary connector 912 may be the same as or substantially similar to auxiliary connector 812 with the exception that the end of auxiliary 912 may have a substantially cylindrical receptacle 976 in place of receptacle 876. In this manner, auxiliary connector 912 may be mated with a light source substantially similar to light source 860 but with a corresponding cylindrically shaped tip.

The use of splitter 980 in which a single bore on one side receives main jacket 910 and splits into an equally sized pair of smaller bores to "fan out" extension jacket 982 and auxiliary jacket 984 of cable 900, as shown, allows the use of a single jacket along most of the length of the cable in which that cable may have a conventional cable size, e.g., an approximately 900 μm to 3000 μm diameter while at the same time gradually bending illumination element 940 away from optical fiber 130. In this example, light 150 may be introduced into receptacle 976 and through termination end 945 on an end of illumination element 940 by inserting a tip of the light source into the receptacle.

Figure 9B:
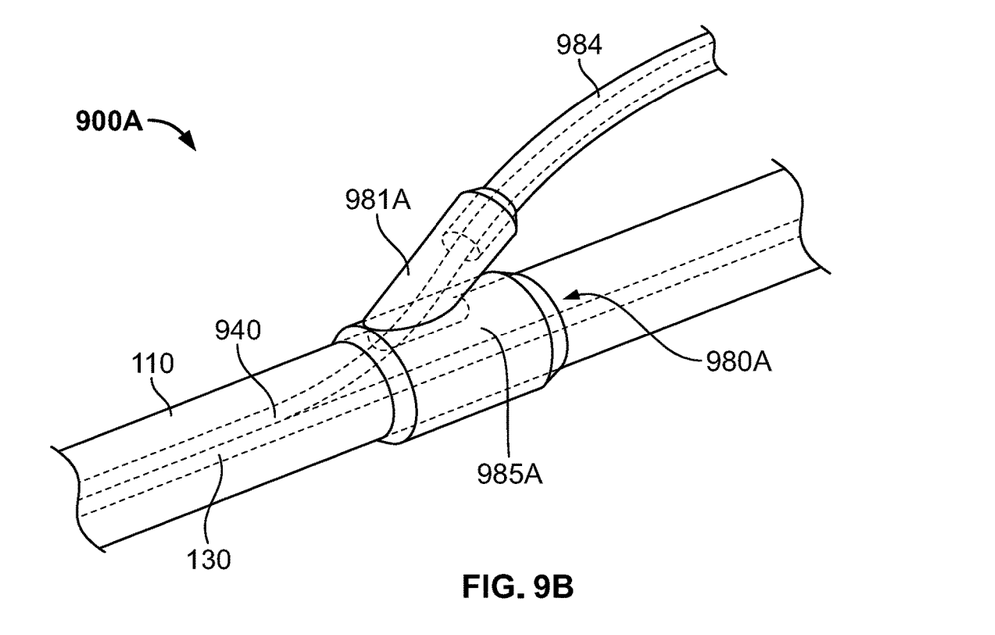
FIG. 9B is a partial perspective view of a cable in accordance with another embodiment.

As shown in FIG. 9B, cable 900A is the same as or substantially the same as cable 900 with the exception that main jacket 910 is replaced with jacket 110, extension jacket 982 is removed, and splitter 980 is replaced with splitter 980A. In this arrangement, jacket 110 may be attached to cable connectors 111A, 111B in the same manner as shown in FIG. 1. Splitter 980A includes branching bore 981A and straight main bore 985A from which the branching bore extends in a transverse direction. Branching bore 981A receives a portion of auxiliary jacket 984 extending from the branching bore. In this manner, illumination element 940 passes from jacket 110, into main bore 985A, into an opening at a juncture between the main bore and the branching bore, through the branching bore, and into auxiliary jacket 984. While, auxiliary jacket 984 branches away, jacket 110 passes through main bore 985A in a substantially straight direction, in contrast to the substantially equal separation that occurs between extension jacket 982 and auxiliary jacket 984 of cable 900 shown in FIG. 9A.

Figure 10A:
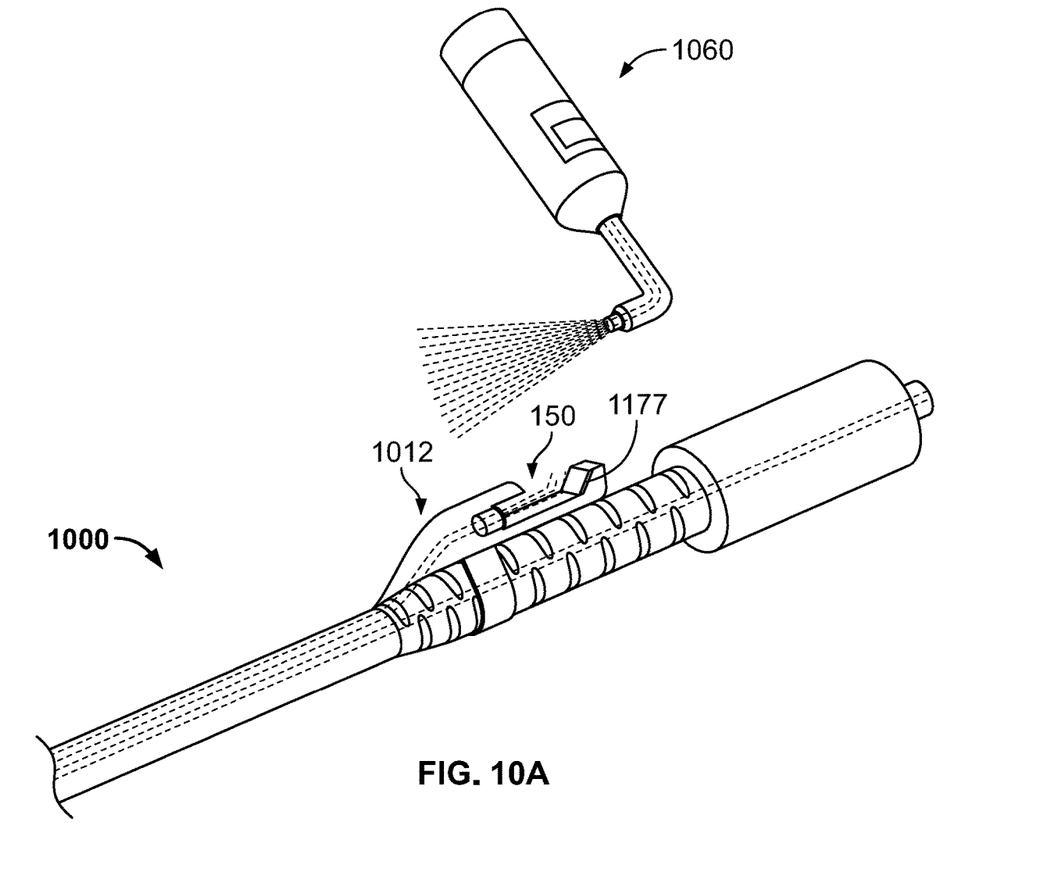
FIG. 10A is a partial perspective view of a cable connection verification system in accordance with another embodiment.

Referring now to FIG. 10A, cable 1000 may be the same as or substantially the same as cable 500 with the exception that cable 1000 may include extension connector cover 1012 in place of extension connector cover 512. Similarly, with reference to FIG. 10B, cable assembly 1100 may be the same as or substantially the same as cable 600 with the exception that cable assembly 1100 may include auxiliary connector 1112 in place of auxiliary connector 612. Both extension connector cover 1012 and auxiliary connector 1112 may be substantially the same as auxiliary connector 912 with the exception that each of extension connector cover 1012 and auxiliary connector 1112 includes a distal portion, i.e., a portion further from the middle of respective cable 1000 and cable assembly 1100, that extends from the rest of the respective extension connector cover or auxiliary connector and that includes respective angled surface 1077 of the extension connector cover and angled surface 1177 of the auxiliary connector. Each of angled surface 1077 of cable 1000 and angled surface 1177 of cable assembly 1100 may have a rough surface or utilize a highly light-scattering material. In this manner, light 150 scatters upon hitting angled surface 1077, 1177 such that the light becomes visible in wider angle directions, improving the ability to identify a corresponding cable connection. To minimize transmission loss of light 150 through the illumination element, a single mode optical fiber at a desired wavelength, e.g., a wavelength visible to the human eye, may be used. For a communication wavelength which is invisible (e.g., a wavelength of 850 nm, 1310 nm, 1550 nm, etc.), either of angled surface 1077 of cable 1000 and angled surface 1177 of cable assembly 1100, as the case may be, may be coated with a fluorescent material to allow for visualization of otherwise undetectable light emitted from the angled surface.

Figure 10B:
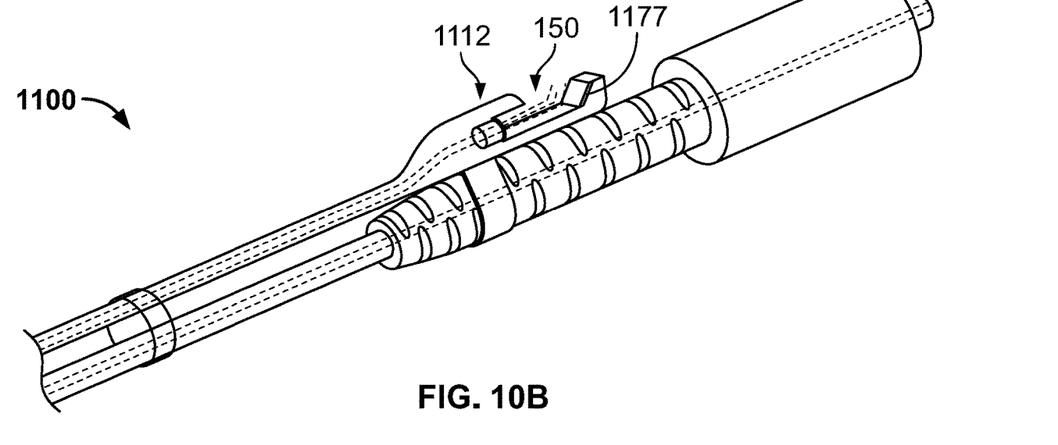
FIG. 10B is a partial perspective view of a cable in accordance with another embodiment.

As shown in FIG. 10A, light source 1060 may be inserted into extension connector cover 1012 of cable 1000 (and similarly into auxiliary connector 1112 of cable assembly 1100). Light source 1060 may be substantially the same as light source 560 with the exception that light source 1060 may supply pulsed light emissions, which may be at regular or irregular intervals, in order to enhance detectability.

In some arrangements, a sensor (not shown) may be placed adjacent to either of termination faces 145A, 145B, termination faces 245A, 245B, termination faces 345A, 345B, termination ends 545A, 545B, termination ends 645, and termination ends 945 to detect the emission of light 150 therefrom, which may be used to identify the location of the cable connectors adjacent to the respective termination faces or termination ends. Light 150 may be visible to the human eye such that it may be detected by a human user or may be invisible to the human eye and detectable only by sensors sensitive to such invisible light, e.g., infrared or ultraviolet light. As light visible to the human eye, light 150 may be but is not limited to being green, blue, or red. In some arrangements, light 150 may include a modulated optical signal.

Figure 11:
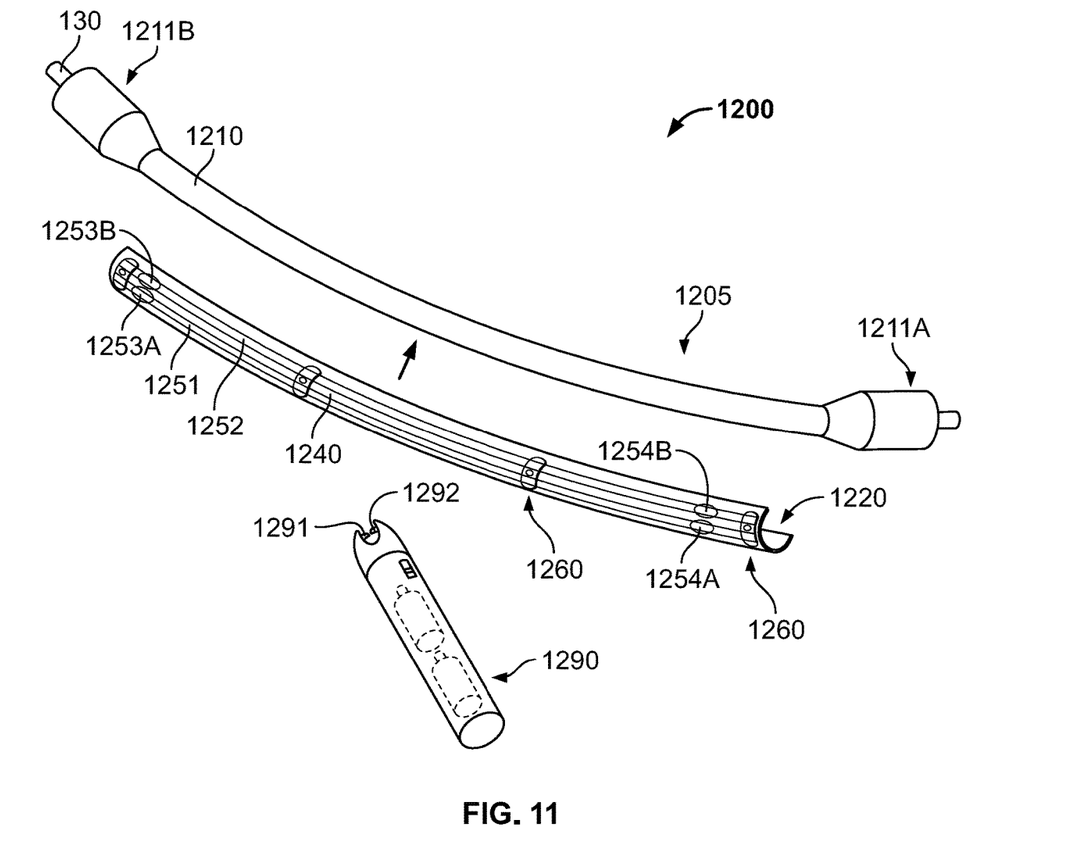
FIG. 11 is a perspective view of a cable connection verification system in accordance with another embodiment.

Referring now to FIG. 11, cable verification system 1200 may include cable 1205, strip 1220, and voltage source 1290. Cable 1205 may include jacket 1210 and optical fiber 130 extending through the jacket which is substantially similar to jacket 110 of cable 100 and other jackets described previously herein.

Strip 1220 includes elongated body 1240, electrically conductive wires 1251, 1252 which as shown may be in the form of traces, and one or more light sources 1260. In some arrangements, elongated body 1240 may be flexible such that it may be conformed to cable 1205 having a rounded outer surface. In such arrangements, elongated body 1240 may be but are not limited to being made of polyurethane, vinyl, polyethylene terephthalate (PET), silicone, and polyethylene. In other arrangements, elongated body 1240 may be made rigid such that elongated body 1240, and thus strip 1220, may be fixed onto cable 1205 by way of an interference fit. In any of these arrangements, elongated body 1240, and thus strip 1220, may be adhered to cable 1205 by an adhesive such as by but not limited to being by epoxy.

Electrically conductive wires 1251, 1252 may be embedded in elongated body 1240, as shown, or may be attached to the surface of the elongated body, such as by an adhesive. Wires 1251, 1252 may be separated from contact with each other, as further shown. A plurality of light sources 1260, which may be light-emitting diodes (LEDs), may be simultaneously attached to both electrically conductive wires 1251, 1252. As in the arrangement shown, portions of elongated body 1240 over each of electrically conductive wires 1251, 1252 may be removed to expose portions of each of the wires in the form of a first set of contacts 1253A, 1253B and a second set of contacts 1254A, 1254B. As shown, each of the sets of contacts may be prepared at or, as shown, adjacent to ends of elongated body 1240.

As shown, voltage source 1290 may be in the form of an electrical probe with opposing terminals 1291, 1292. As in the example shown, voltage source 1290 may be battery-powered, although in other arrangements the opposing terminals may be attached to other power sources, such as a utility power source. Opposing terminals 1291, 1292 may be made to contact either the first set of contacts 1253A, 1253B or the second set of contacts 1254A, 1254B. In this manner, an electrical current may be generated through closure of an electrical circuit made of the electrically conductive wires 1251, 1252 and one or more of light sources 1260. In such a manner, a correspondence of cable connectors 1211A, 1211B of cable 1200 may be detected to differentiate the cable connectors from such connectors of other cables which may be nearby in a connector system without having to disconnect either of the cable connectors from a corresponding terminal or port.

In various alternative arrangements, it is to be understood that auxiliary connectors 612, 712, 812, 912, 1012 may be interchanged.

It is to be understood that, although the technology disclosed herein has been described with examples using ST connectors, this technology may be employed into several other types of connectors including but not limited to LC, SC, MPO, MTP, FC, and MU connectors. In general, the technology may be used on connectors providing space to receive ends of an illumination element therein. It is to be further understood that the jacket, such as jacket 110, 210, 310, 410, and the sheaths, such as sheaths 113, 313, may constitute an outer cover over the entirety of the corresponding cable, e.g., cable 100, 200, 300, 400, 500, 1000.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments set forth above and that other arrangements may be devised without departing from the spirit and scope of the present technology. In this regard, the present technology encompasses numerous additional features in addition to those specific features set forth herein. Moreover, the foregoing disclosure should be taken by way of illustration rather than by way of limitation as the present invention is defined by the paragraphs set forth below.

The invention claimed is:

1. A cable device comprising:
   a jacket having an outer surface, a central bore, and defining a linear or curvilinear central axis;
   an illumination element interior of the outer surface of the jacket and extending in a direction parallel to the central axis and along a length of the jacket, the illumination element having first and second exposed portions, the first and the second exposed portions of the illumination element having respective first and second cross-sections and defining first and second illumination element central axes extending orthogonally to the respective first and second cross-sections of the first and the second exposed portions, wherein the illumination element is configured to convey a given light such that the given light that enters the first exposed portion of the illumination element exits the second exposed portion of the illumination element;
   cable connectors at opposing ends of the jacket and configured for interfacing with panel connectors, the cable connectors defining first and second connector central axes, wherein either one or both of the first and the second illumination element central axes intersect and extend in one or more directions transverse to the respective first and second connector central axes of the cable connectors;
   an optical fiber extending through the central bore of the jacket and through the cable connectors; and
   a first auxiliary connector including an angled surface intersecting the first illumination element central axis such that the angled surface redirects light that exits the first exposed portion of the illumination element and defining a portion of a receptacle, the receptacle being configured for receiving a tip of a light source between the first exposed portion of the illumination element and the angled surface, the first exposed portion of the illumination element being within the first auxiliary connector and configured for receiving the given light from the tip of the light source when the tip is received in the receptacle.

2. The cable device of claim 1, wherein the illumination element and the optical fiber are surrounded by the jacket along respective lengths thereof.

3. The cable device of claim 2, wherein the illumination element further includes first and second optical elements, the first and second optical elements being configured to convey light and being received through the respective separated openings in the one or more transverse directions to the central axis of the jacket.

4. The cable device of claim 1, wherein first and second sections of the illumination element that include the first and the second exposed portions of the illumination element, respectively, extend through respective openings in the cable connectors.

5. The cable device of claim 1, wherein the first and the second exposed portions are adjacent to respective opposing ends of the optical fiber such that the given light that enters the first exposed portion of the illumination element and exits the second exposed portion of the illumination element provides an indication that the opposing ends of the optical fiber are associated with each other.

6. The cable device of claim 1, wherein the illumination element includes an optical fiber.

7. The cable device of claim 1, wherein the jacket has an inner surface separated from the outer surface to define a thickness and the central bore of the jacket, and wherein the illumination element extends within at least a portion of the thickness of the jacket.

8. The cable device of claim 1, wherein the jacket has an inner surface separated from the outer surface to define a thickness and the central bore of the jacket, and wherein a length of the illumination element extends through the central bore.

9. The cable device of claim 1,
wherein the central bore includes a cladding and a plurality of cores spaced from each other, the cores being embedded within the cladding and extending through the central bore of the jacket in a direction parallel to the central axis along a length thereof; and
wherein a first core of the cores includes at least a portion of the illumination element and has faces exposed by the cladding, the faces defining first and second core central axes therethrough extending in at least one direction transverse to the central axis of the jacket, wherein the first core is configured to convey a given light such that the given light that enters one of the faces of the first core exits the other of the faces of the first core.

10. The cable device of claim 9, wherein a second core of the cores is configured for optical connection with an optical fiber connector.

11. The cable device of claim 10, wherein the faces of the first core are adjacent to respective opposing ends of the second core such that the given light that enters the one face of the first core and exits the other face of the first core provides an indication that opposing ends of the second core are associated with each other.

12. The cable device of claim 9, further comprising an electrically conductive wire extending through the central bore of the jacket, the electrically conductive wire being configured for electrical connection with an electrical connector.

13. The cable device of claim 12, wherein the opposing end faces of the first core are adjacent to respective opposing ends of the electrically conductive wire such that the given light that enters the one face of the first core and exits the other face of the first core provides an indication that the opposing ends of the electrically conductive wire are associated with each other.

14. The cable device of claim 1, wherein a first section of the illumination element that includes the first exposed portion of the illumination element and a second section of the illumination element that includes the second exposed portion of the illumination element are bounded by respective separated openings of the outer surface.

15. The cable device of claim 1, further comprising a second auxiliary connector including an angled surface, the second exposed portion of the illumination element being within the second auxiliary connector such that at least a portion of the given light that exits the second exposed portion of the illumination element is redirected by the angled surface.

16. The cable device of claim 15, wherein the angled surface is roughened such that the given light scatters upon hitting the angled surface.

17. The cable device of claim 16, wherein the angled surface is coated with a fluorescent material.

18. A cable device comprising:
an elongated transmission member defining a linear or curvilinear central axis;
a first jacket having a first outer surface and a first central bore along a length of the first jacket;
an illumination element having a first section extending in a direction parallel to the central axis and along a length of the transmission member and second sections attached to opposite sides of the first section, the second sections of the illumination element having first and second exposed portions having respective first and second cross-sections, each of the first and the second cross-sections defining respective first and second illumination element central axes extending therethrough in one or more directions transverse to the central axis of the transmission member, wherein the illumination element is configured to convey a given light such that the given light that enters the first exposed portion of the illumination element exits the second exposed portion of the illumination element;
a second jacket having a second outer surface and a second central bore along a length of the second jacket, the transmission member extending through the second central bore; and
a first auxiliary connector including an angled surface defining a portion of a receptacle, the receptacle being configured for receiving a tip of a light source between the second exposed portion of the illumination element and the angled surface, the second exposed portion of the illumination element being within the first auxiliary connector such that at least a portion of the given light that exits the second exposed portion of the illumination element is redirected by the angled surface,
wherein the first exposed portion of the illumination element is configured for receiving light conveyed from the tip of the light source when the tip is received in the receptacle, and
wherein one of the second sections of the illumination element extends through the first central bore of the first jacket and the first section of the illumination element extends through at least a portion of the second jacket.

19. The cable device of claim 18, wherein the transmission member is an optical fiber or an electrically conductive wire.

20. The cable device of claim 18, wherein the first jacket is attached to and extends from the second jacket.

21. The cable device of claim 20, wherein the first auxiliary connector includes a portion of the first central bore having a stepped configuration for receiving a corresponding stepped configuration of a tip of a light source.

22. The cable device of claim 18, further comprising a cable connector attached at an end of the second jacket, wherein the first jacket extends from the cable connector.

23. The cable device of claim 22, wherein the first jacket includes a clip, and wherein the clip is attachable to the cable connector to maintain the position of the first jacket relative to the cable connector.

24. The cable device of claim 18, wherein the first auxiliary connector is attached at an end of the first jacket, further comprising a cable connector attached at an end of the second jacket, and the first auxiliary connector being attachable to the cable connector to maintain the position of the first jacket relative to the cable connector.

25. The cable device of claim 24, wherein the receptacle includes a concave surface on an end thereof, and wherein the first exposed portion of the illumination element aligns with and is exposed to the center of the concave surface.

26. The cable device of claim 24, wherein the receptacle includes an opening configured for receiving a light source in a direction generally transverse to the central axis of the transmission member, and wherein the first exposed portion of the illumination element is exposed to a portion of the receptacle.

27. The cable device of claim 26, wherein the opening has a first circumference and the receptacle includes a holding region having a second circumference larger than the first circumference such that the light source is retained by the receptacle when the light source is received in the holding region of the receptacle.

28. The cable device of claim 18, wherein the angled surface of the first auxiliary connector is roughened.

29. The cable device of claim 28, wherein the roughened surface is coated with a fluorescent material.

30. The cable device of claim 18, wherein the first jacket completely surrounds a majority of the length of the illumination element.

31. A cable connection verification system comprising:
the cable device of claim 18; and
a light source configured to emit the given light to the first exposed portion of the illumination element.

32. The cable connection verification system of claim 31, wherein the illumination element is a single mode optical fiber for conveying the given light at the wavelength of the given light.

33. The cable device of claim 18, further comprising a second auxiliary connector defining a receptacle, the first exposed portion of the illumination element being within the second auxiliary connector and configured for receiving the given light from a tip of a light source when the tip is received in the receptacle.

34. The cable device of claim 18, wherein the angled surface is configured for scattering the given light when the given light is redirected by the angled surface.

35. The cable device of claim 18, wherein the angled surface is coated with a fluorescent material.

36. A cable device comprising:
an elongated transmission member defining a linear or curvilinear central axis;
a first jacket having a first outer surface and a first central bore along a length of the first jacket;
an illumination element having a first section extending in a direction parallel to the central axis and along a length of the transmission member and second sections attached to opposite sides of the first section, the second sections of the illumination element having first and second exposed portions having respective first and second cross-sections, each of the first and the second cross-sections defining respective first and second illumination element central axes extending therethrough in one or more directions transverse to the central axis of the transmission member, wherein the illumination element is configured to convey a given light such that the given light that enters the first exposed portion of the illumination element exits the second exposed portion of the illumination element;
a second jacket having a second outer surface and a second central bore along a length of the second jacket, the transmission member extending through the second central bore;
an auxiliary connector attached at an end of the first jacket, at least the end of the first jacket being separable from the second jacket;
a cable connector attached at an end of the second jacket,
wherein the auxiliary connector is attached to the cable connector by a clip to maintain the position of the auxiliary connector relative to the cable connector and such that the auxiliary connector is separable from the cable connector, and
wherein one of the second sections of the illumination element extends through the first central bore of the first jacket and the first section of the illumination element extends through at least a portion of the second jacket.

* * * * *